US006970067B1

(12) United States Patent
Sinke et al.

(10) Patent No.: US 6,970,067 B1
(45) Date of Patent: Nov. 29, 2005

(54) SYSTEM FOR PROVIDING PERSONALIZED SERVICES

(75) Inventors: Johannes G. Sinke, Eindhoven (NL); Nathalie D. P. Leurs, Eindhoven (NL); Henricus A. W. Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/557,597

(22) Filed: Apr. 25, 2000

(30) Foreign Application Priority Data

Apr. 26, 1999 (EP) .................................. 99201296

(51) Int. Cl.⁷ .......................... G05B 19/00; G06F 7/00; G08B 29/00; H04B 1/00; H04Q 9/00
(52) U.S. Cl. ................. 340/5.65; 340/5.6; 340/825.36; 340/572.1; 348/134
(58) Field of Search ................. 340/5.6–5.67, 340/825.36, 825.49, 572.1–572.9, 573.1, 340/5.72, 5.8, 5.81; 348/734

(56) References Cited

U.S. PATENT DOCUMENTS

| | | | | |
|---|---|---|---|---|
| 4,598,275 A | * | 7/1986 | Ross et al. .................... 340/573 |
| 5,005,084 A | * | 4/1991 | Skinner .................... 358/194.1 |
| 5,341,166 A | * | 8/1994 | Garr et al. ..................... 348/10 |
| 5,469,206 A | * | 11/1995 | Strubbe et al. ................. 348/7 |
| 5,525,977 A | * | 6/1996 | Suman ................... 340/825.25 |
| 5,541,585 A | * | 7/1996 | Duhame et al. ............ 340/5.62 |
| 5,686,887 A | * | 11/1997 | Chen et al. .................. 340/539 |
| 5,825,283 A | * | 10/1998 | Camhi ........................ 340/438 |
| 5,929,769 A | * | 7/1999 | Garnault ................ 340/825.31 |
| 5,983,347 A | * | 11/1999 | Brinkmeyer et al. ........ 340/5.62 |
| 5,990,885 A | * | 11/1999 | Gopinath ..................... 715/716 |
| 6,034,617 A | * | 3/2000 | Luebke et al. .......... 340/825.31 |
| 6,265,974 B1 | * | 7/2001 | D'Angelo et al. ........ 340/568.1 |
| 6,285,357 B1 | * | 9/2001 | Kushiro et al. .............. 345/169 |
| 6,295,057 B1 | * | 9/2001 | Rosin et al. ................. 345/335 |
| 6,359,661 B1 | * | 3/2002 | Nickum ...................... 348/734 |

* cited by examiner

Primary Examiner—Michael Horabik
Assistant Examiner—Nam Nguyen
(74) Attorney, Agent, or Firm—Gregory L. Thorne

(57) ABSTRACT

A system comprises an apparatus which is capable of personalizing its behavior in accordance with a user profile, and a gatekeeper device which comprises control means for allowing a user to control said personalization of the apparatus. The gatekeeper device is capable of detecting apparatuses which have personalization capabilities and of notifying the user upon such detection. The user may then decide to establish a relationship with the apparatus, which relationship specifies the extent of personalization which the apparatus is allowed to exhibit and whether confirmation by the user is required at fixture occasions. The user is allowed to change the relationship at any time. The system enables the user to build up anonymous relationships with various apparatuses, providing the user with personalized services while privacy is guaranteed.

15 Claims, 1 Drawing Sheet

SYSTEM FOR PROVIDING PERSONALIZED SERVICES

FIELD OF THE INVENTION

The invention relates to a system for providing personalized services.

The invention also relates to an apparatus and a gatekeeper device for use in the above system.

The invention furthermore relates to a method for providing a personalized services.

BACKGROUND OF THE INVENTION

A system of the above type is widely known. For example, it is known to store user profiles in consumer equipment to enable personalized operation in response to the user activating his user profile, for example, by means of an on-screen menu. Such a user profile may comprise information relating to the user's favorite TV or radio channels and the presets they should be assigned to. It may also comprise information about preferred parameter settings such as sound level, picture contrast, brightness etc.

It is foreseen that in the near future an increasing number of apparatuses will store information about personal data or preferences of users in order to adapt (personalize) their behavior to a particular user. On the one hand this will lead to increased usability and efficiency. On the other hand in the apparatuses involved user profiles have to be built up and activated each time the apparatus is used. This may involve inserting a chip-card, or entering a password, which is inconvenient. Alternatively, the user may be recognized by automatic identification (fingerprint, face or voice recognition, transponder technology), but a disadvantage of such systems is that privacy is not guaranteed.

OBJECT AND SUMMARY OF THE INVENTION

It is an object of the invention to provide an improved system of the type defined in the opening paragraph. To that end, the system according to the invention comprises a gatekeeper device, which is capable of communicating an identity tag with at least one apparatus, the gatekeeper device comprising user operable control means for controlling said communication of identity tags, thus acting as a gatekeeper to prevent uncontrolled use of personal information by the apparatus to be operated. Said gatekeeper device may be a small tool which can be carried by the user, for example, in the form of a decoration. It enables the user to build up anonymous relationships with various apparatuses. No personal identity codes and no biometric features need to be communicated, and the identity tags only have sense for one specific relationship. In response to the user expressing a wish to establish a relationship with an apparatus, for example, by means of a suitable button on the gatekeeper device, an identity tag is generated to identify said relationship and stored in both the gatekeeper device and the apparatus. In a preferred embodiment, the apparatus and the gatekeeper device are capable of remote, for example, RF, capacitive or infrared, communication.

Said control means enable the user to specify whether the gatekeeper device should be recognized by an apparatus to be operated, and to which extent the operated apparatus should adapt its behavior to the user. In the most simple embodiment, the user has the choice between personalized and non-personalized behavior. For example, the gatekeeper device may notify the user that an apparatus is approached which is capable of personalizing its behavior and already has a relationship with the gatekeeper device or is capable of engaging in such a relationship. In a preferred embodiment the apparatus is not aware of the gatekeeper device until the user explicitly confirms that such a relationship may be established or exploited. The privacy and anonymity of the user is thus guaranteed.

The gatekeeper device in a further embodiment allows the user to specify how the operated apparatus and the gatekeeper device have to communicate in subsequent occasions. For example, the user may specify that the apparatus may automatically adapt its behavior as soon as the gatekeeper device is recognized, or under which conditions, e.g. only in the day time and not in the evening or during the night. The user may disable said automatic recognition at each of said subsequent occasions, e.g. by specifying that from that moment on an explicit confirmation by the user is required. Finally, the gatekeeper device may allow the user to terminate a relationship, causing the user profile to be removed and the identity tag to be made invalid. A relationship may involve one specific apparatus exclusively, or it may involve multiple similar apparatuses, e.g. from the same manufacturer. A user profile may be stored with the identity tag in the gatekeeper device and transmitted each time to the apparatus to be operated. Alternatively, the user profile may be stored in the apparatus to be operated, waiting to be activated by the identity tag obtained from the gatekeeper device. In both cases the user profile may be shared with other apparatuses, e.g. by transmission through a network connecting the apparatuses; or by making the apparatuses respond to the same identity tag in order to obtain the user profile from the gatekeeper device. A relationship may involve multiple user profiles which are selected by the user or automatically activated in accordance with certain conditions, e.g. the time of the day.

BRIEF DESCRIPTION OF THE DRAWINGS

These and other aspects of the invention are apparent from and will be elucidated, by way of a non-limitative example, with reference to the embodiment described hereinafter. In the drawings.

DESCRIPTION OF EMBODIMENT

Figure 1:
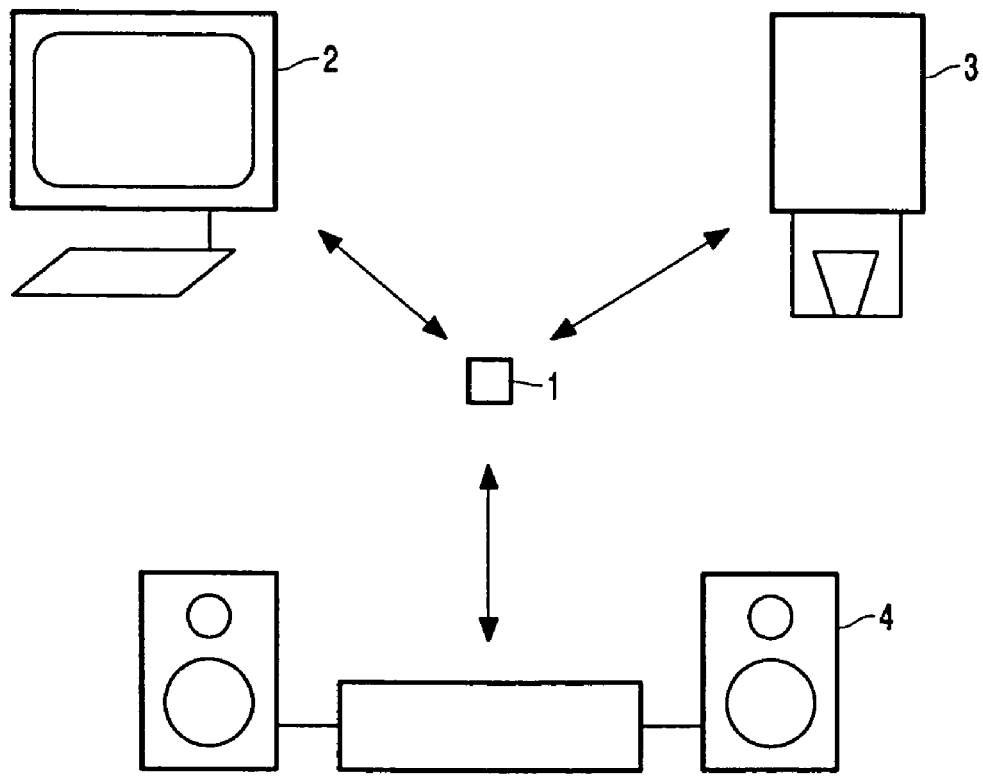
FIG. 1 shows a diagram of a system according to the invention, comprising various apparatuses and a gatekeeper device.

FIG. 1 shows a diagram of a system according to the invention, comprising a gatekeeper device 1 and various apparatuses to be operated, such as an information terminal 2, a coffee machine 3 and an audio system 4. Each of the apparatuses 2, 3 and 4 is capable of adapting its behavior to a specific user in response to information obtained from the gatekeeper device 1. For example, the information terminal 2 tailors the information it provides to the knowledge and background of the user. The coffee machine 3 knows the user's taste and suggests this as a default choice. The audio systems compiles CD-tracks and adjusts the sound parameters in accordance with the user's taste. The apparatuses 2, 3 and 4 continuously transmit an RF signal indicating that they are responsive to a gatekeeper device. Alternatively, infrared or ultrasound signals could be used or capacitive or inductive techniques may be utilized. If the gatekeeper device 1 approaches one of the devices 2, 3 or 4, it detects the RF signal and notifies the user, e.g. by a flashing light, a beep or a vibration. Dependent on the relationship which exists between the gatekeeper device 1 and the apparatus 2, 3 or 4, the gatekeeper device 1 may decide to send an identity tag to the apparatus autonomously, or leave that decision to the user. Upon receiving the identity tag, the apparatus can adapt its behavior to the user profile associated with the identity tag.

The gatekeeper device 1 is provided with user operable controls to allow the user to establish, terminate or alter relationships with various apparatuses.

Figure 2:
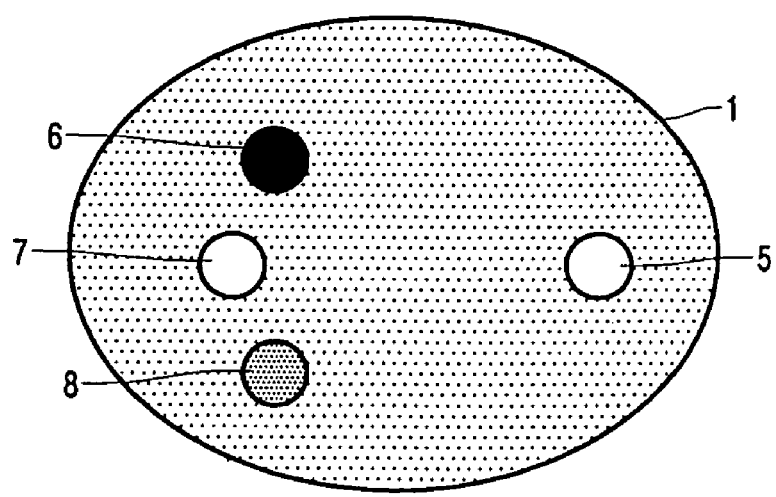
FIG. 2 shows an embodiment of the gatekeeper device.

FIG. 2 shows an embodiment of the gatekeeper device 1 which will be referred to as the 'gatekeeper' henceforth. It comprises four buttons 5, 6, 7, and 8. The button 5 is used for switching the gatekeeper on and off. If the gatekeeper is switched off, the signals from all apparatuses are ignored and no personalized behavior is exhibited. If the gatekeeper is switched on, various situations may occur which will be discussed hereinafter. The buttons 6, 7 and 8 allow the user to make various choices regarding the relationships with the apparatuses 2, 3, and 4. Button 6 has a red color and enables the user not to exploit the personalization capabilities of the apparatus (stay unrecognized). Button 7 has an orange color and enables the user to establish an explicit relationship with the apparatus, which means that the user has to confirm each time the apparatus is used. Button 7 is combined with a LED which can make the button blink. Button 8 has a green color and enables the user to establish an implicit relationship with the apparatus, which means that the apparatus is allowed to adapt its behavior without confirmation by the user.

The following situations may occur:

1) New Relationship:

If the gatekeeper is switched on and there is no relationship yet with the apparatus to be operated, the orange button 7 starts blinking, indicating that the apparatus is capable of engaging in such a relationship. If the user does nothing, no relationship is established and the personalization capabilities of the apparatus are not exploited. The next time the apparatus is approached, the button 7 will start blinking again.

By pressing the red button 6, the user indicates that no relationship is desired, making the gatekeeper remember the apparatus and ignore the apparatus in the future, without notifying the user.

By pressing the orange button 7, the user indicates that he wishes to establish an explicit relationship. The apparatus associates an identity tag or key with the new relationship and transmits it to the gatekeeper which stores the key for future identification of the apparatus. A user profile is then built up by watching the user's habits in operating the apparatus. Alternatively, a user profile related to a similar apparatus may be entered explicitly by the user or transferred to the apparatus, either from a memory in the gatekeeper or via a network connecting the apparatus with similar apparatuses. The next time the apparatus is approached, the user is asked for a confirmation (by means of the blinking orange button 7). If the user confirms, the stored key is transmitted to the apparatus to identify the relationship and the user profile associated to the relationship is activated. If the user profile is stored in the gatekeeper, it is transmitted to the apparatus.

By pressing the green button 8, the user indicates that he wishes to establish an implicit relationship. The same actions are performed as when pressing the orange button, thus establishing a new relationship, however, the next time the apparatus is approached, the user is not asked for confirmation and the user profile associated with the relationship is activated automatically.

If the user pressed the red button a previous time, the gatekeeper does not notify the user if an apparatus is approached which is responsive to the gatekeeper. Nevertheless, the user can establish a relationship by pressing the orange or green button. Each successful action may be confirmed, e.g. by a beep or blinking LED.

2) Explicit Relationship:

If the gatekeeper approaches an apparatus for which an explicit relationship exists, the gatekeeper recognizes the apparatus. This could be realized in various ways. As described hereinbefore, the apparatus initially identifies itself to the gatekeeper by transmitting a signal. This signal could comprise an 'apparatus key' which also constitutes a part of said identity tags or keys distributed by the apparatus to identify relationships with various gatekeeper devices. The apparatus can be recognized by comparison of the apparatus key with the relationship keys stored in the gatekeeper. Additionally, a 'manufacturer's key' may be contained in the apparatus key, so as to identify the manufacturer of the apparatus. This enables the gatekeeper to recognize similar apparatuses from the same manufacturer and establishing relationships utilizing the same user profile. Alternatively, the gatekeeper explicitly relates the identity tags to the identity of the apparatus from which the tag was received.

Upon recognition of the apparatus, the orange button 7 starts blinking, waiting for the user's confirmation. If the user does nothing, the personalization capabilities of the apparatus are not exploited (this time). The user may confirm by pressing the button 7, thus activating the personalized behavior, or convert the explicit relationship into an implicit relationship by pressing the green button 8. The user may also terminate the explicit relationship by pressing the red button 6.

3) Implicit Relationship:

If the gatekeeper approaches an apparatus with which an implicit relationship exists, the gatekeeper recognizes the apparatus as described hereinbefore. No confirmation by the user is awaited and the personalized behavior is activated immediately. However, the user may decide to convert the implicit relationship into an explicit relationship by pressing the orange button 7 or by terminating the relationship at all by pressing the red button 6.

Although the invention has been described with reference to particular illustrative embodiments, further versions and modifications are feasible within the scope of the inventive concept.

Thus, for example, various user profiles may be involved in one relationship, each user profile corresponding to personal information of a different level of confidentiality. For example, medical data relating to the user may be incorporated in a user profile, e.g. for searching a library catalogue, but not in every situation, e.g. in the presence of bystanders.

The gatekeeper enables users to express different identities. People behave different 4 at home, at work or in the pub. The gatekeeper is a tool that enables users to exert control over their expressed identities. People may possess multiple gatekeepers, each with a different appearance and suited for a different situation. Wearing two or more gatekeepers in combination may have the effect that the user profiles are combined in some way.

Multiple gatekeepers may simultaneously control the behavior of one particular apparatus. For example, a message board or teleconference system shared by several users may allow each user to specify which personal information may be presented to the other users. For other parameters, such as sound level and picture brightness, the apparatus may attempt to find a compromise between the different values from the various user profiles.

The word 'comprising' does not exclude the presence of elements or steps other than those listed in a claim.

In summary, the invention relates to a system for providing personalized services. The system comprises an apparatus which is capable of personalizing its behavior in accordance with a user profile, and also a gatekeeper device comprising control means for allowing a user to control said personalization of the apparatus. The gatekeeper device is capable of detecting apparatuses which have personalization capabilities and of notifying the user upon such detection. The user may then decide to establish a relationship with the apparatus, which relationship specifies the extent of personalization which the apparatus is allowed to exhibit and whether confirmation by the user is required at future occasions. The user is allowed to change the relationship at any time. The system according to the invention enables the user to build up anonymous relationships with various apparatuses, providing the user with personalized services while privacy is guaranteed.

What is claimed is:

1. A system for providing personalized services, comprising
   an apparatus which is capable of personalizing its behavior in accordance with a user profile, and
   a gatekeeper device that is configured to selectively transmit a user identification only, in response to receipt of a communication from the apparatus,
   wherein
   the apparatus is configured to effect the personalizing of its behavior based on the user identification, characterized in that
   the apparatus is further configured to:
       generate an identity tag which identifies a select personalization, and
       communicate the identity tag to the gatekeeper device, the gatekeeper device being capable of storing said identity tag for use as the user identification at subsequent occasions.

2. A system as claimed in claim 1, characterized in that the gatekeeper device includes a user control to selectively transmit the user identification.

3. A system as claimed in claim 1, characterized in that the gatekeeper device is configured to provide notification of the communication from the apparatus.

4. A system as claimed in claim 3, characterized in that the communication from the apparatus includes an identification signal of the apparatus that distinguishes the apparatus from an other apparatus.

5. A system as claimed in claim 1, characterized in that the gatekeeper device is further configured to enable selection of one or more options that affect selectively transmitting the user identification at subsequent occasions.

6. A system as claimed in claim 1, characterized in that the apparatus is further configured to effect the personalizing of its behavior based on user behavior following a prior receipt of the user identification.

7. A gatekeeper device comprising:
   one or more user operable controls, and
   a transceiver that is configured to:
       receive a communication from an apparatus, including an identification of the apparatus,
       determine a state of the gatekeeper device relative to the apparatus, from a plurality of states, based on the identification of the apparatus, and
       selectively transmit an identifier of a user, based on the state of the gatekeeper device relative to the apparatus;
   wherein
   the state of the gatekeeper device relative to the apparatus is selectively controlled by the one or more user operable controls.

8. The gatekeeper device of claim 7, wherein
   the plurality of states includes:
       a first state, wherein the transceiver transmits the identifier of the user only upon an explicit authorization by the user, and
       a second state, wherein the transceiver transmits the identifier of the user without user intervention.

9. The gatekeeper device of claim 8, wherein
   the plurality of states further includes:
       a third state, wherein the transceiver does not transmit the identifier of the user.

10. The gatekeeper device of claim 7, further including
    one or more indicators that are configured to indicate the state of the gatekeeper device relative to the apparatus.

11. A method of controlling transmission of a user identifier from a portable device including:
    receiving, at the portable device, an identification of an apparatus,
    determining a state of the portable device relative to the apparatus from a plurality of states, based on the identification, and
    selectively transmitting the user identifier based on the state of the portable device relative to the apparatus.

12. The method of claim 11, further including:
    receiving a user input at the portable device, and
    controlling the state of the portable device relative to the apparatus based on the user input.

13. The method of claim 12, wherein
    the plurality of states includes:
        a first state, wherein selectively transmitting the user identification includes waiting for an explicit user input to enable the transmitting; and
        a second state, wherein selectively transmitting the user identification includes transmitting the user identification without an explicit user input.

14. The method of claim 13, wherein
    the plurality of states also includes:
        a third state, wherein selectively transmitting the user identification includes preventing the transmitting.

15. The method of claim 11, further including:
    providing an indication of the state of the portable device relative to the apparatus.

* * * * *